United States Patent [19]

Dage et al.

[11] Patent Number: 5,755,378

[45] Date of Patent: May 26, 1998

[54] METHOD AND SYSTEM FOR CONTROLLING AN AUTOMOTIVE HVAC SYSTEM TO PREVENT FORMATION OF CABIN THERMAL STRATIFICATION

[75] Inventors: Gerhard Allan Dage, Franklin; Leighton Ira Davis, Jr., Ann Arbor; Michael Bradley Bauer, Detroit, all of Mich.

[73] Assignee: Ford Global Technologies, Inc., Dearborn, Mich.

[21] Appl. No.: 786,721

[22] Filed: Jan. 21, 1997

[51] Int. Cl.⁶ .................................................. G05D 23/00
[52] U.S. Cl. ..................... 236/91 C; 165/204; 454/75; 236/49.3
[58] Field of Search .................... 236/91 C, 91 R, 236/91 E, 91 F, 49.3; 165/202, 203, 204, 205, 42, 43; 62/244, 186, 180; 454/75

[56] References Cited

U.S. PATENT DOCUMENTS

| | | |
|---|---|---|
| 4,125,150 | 11/1978 | Zelger et al. . |
| 4,368,843 | 1/1983 | Kai et al. ............................... 236/49.3 |
| 4,456,055 | 6/1984 | Yoshimi et al. . |
| 4,549,692 | 10/1985 | Busch et al. . |
| 4,605,160 | 8/1986 | Day . |
| 4,858,824 | 8/1989 | Matsuda et al. . |
| 4,890,666 | 1/1990 | Clark . |
| 4,910,967 | 3/1990 | Takahashi . |
| 4,914,924 | 4/1990 | Takahashi . |
| 4,961,462 | 10/1990 | Iida et al. ............................ 236/91 C X |
| 5,078,316 | 1/1992 | Hara et al. . |
| 5,165,595 | 11/1992 | Horio et al. . |
| 5,167,365 | 12/1992 | Mitoshi et al. . |
| 5,197,667 | 3/1993 | Bowsky et al. . |
| 5,209,079 | 5/1993 | Kajino et al. . |
| 5,305,823 | 4/1994 | Elliot . |
| 5,337,802 | 8/1994 | Kajino et al. ......................... 454/25 X |
| 5,344,070 | 9/1994 | Akasaka et al. . |
| 5,345,776 | 9/1994 | Komazaki et al. . |
| 5,361,984 | 11/1994 | Annerstedt et al. . |
| 5,427,313 | 6/1995 | Davis, Jr. et al. . |
| 5,516,041 | 5/1996 | Davis, Jr. et al. . |
| 5,549,152 | 8/1996 | Davis, Jr. et al. . |
| 5,553,776 | 9/1996 | Davis, Jr. et al. . |
| 5,582,234 | 12/1996 | Samukawa et al. ..................... 165/204 |

OTHER PUBLICATIONS

E. H. MamDani, "Application of Fuzzy Logic to Approximate Reasoning Using Linguistic Synthesis," Dec. 1977, pp. 1182-1191, *IEEE Transactions on Computers*, vol. C-26 No. 12.

G. Legg, "Special Tools and Chips Make Fuzzy Logic Simple," Jul. 6, 1992, pp. 68-76, *EDN-Technology Feature—Integrated Circuits*.

*Primary Examiner*—Harry B. Tanner
*Attorney, Agent, or Firm*—Paul K. Godwin

[57] ABSTRACT

Method and system for modifying the control of an automotive HVAC (heating, ventilation and air conditioning) to prevent the formation of cabin temperature stratification. The control algorithm responds to signals generated by various climate control sensors to calculate a value representing the likelihood of stratification. The stratification strategy achieves the following three functions: (1) calculation of the likelihood of stratification, (2) estimation of probable level of stratification, and (3) modification of strategy to dispel stratification. Fuzzy logic calculations are performed based on fuzzy rules and membership functions to provide these functions and to allow the control to be expressed in simple heuristic terms.

7 Claims, 6 Drawing Sheets

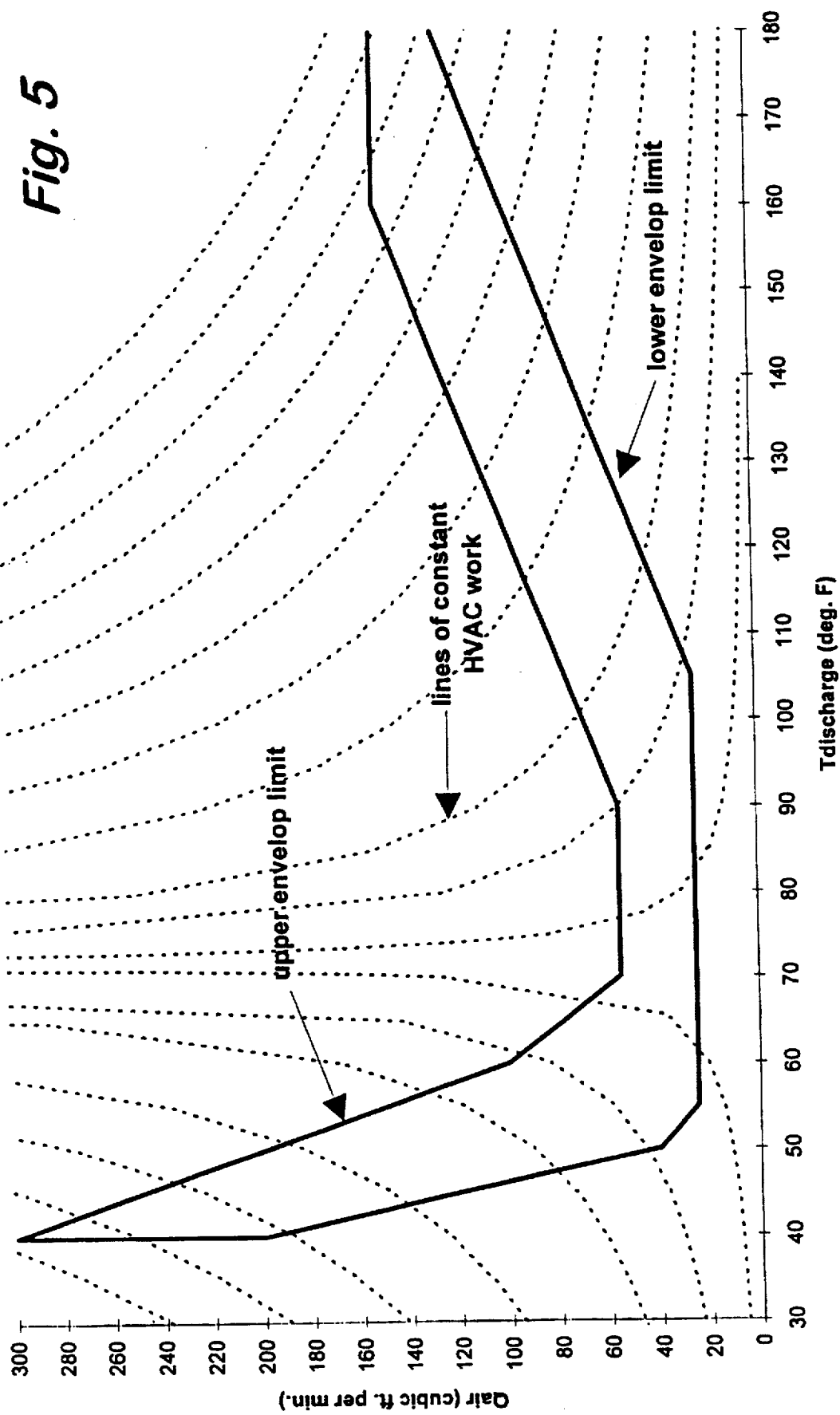

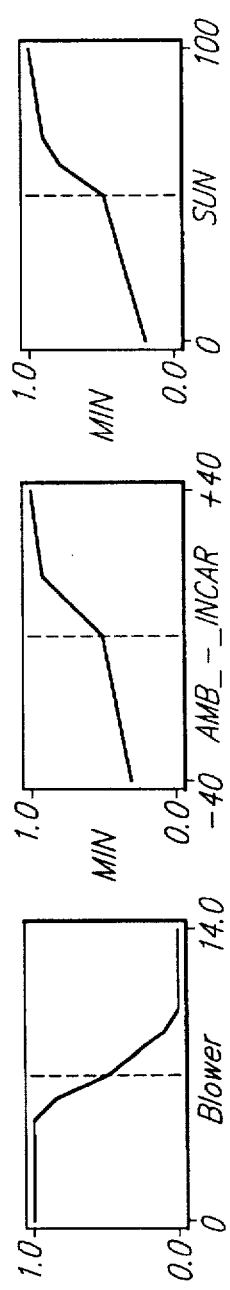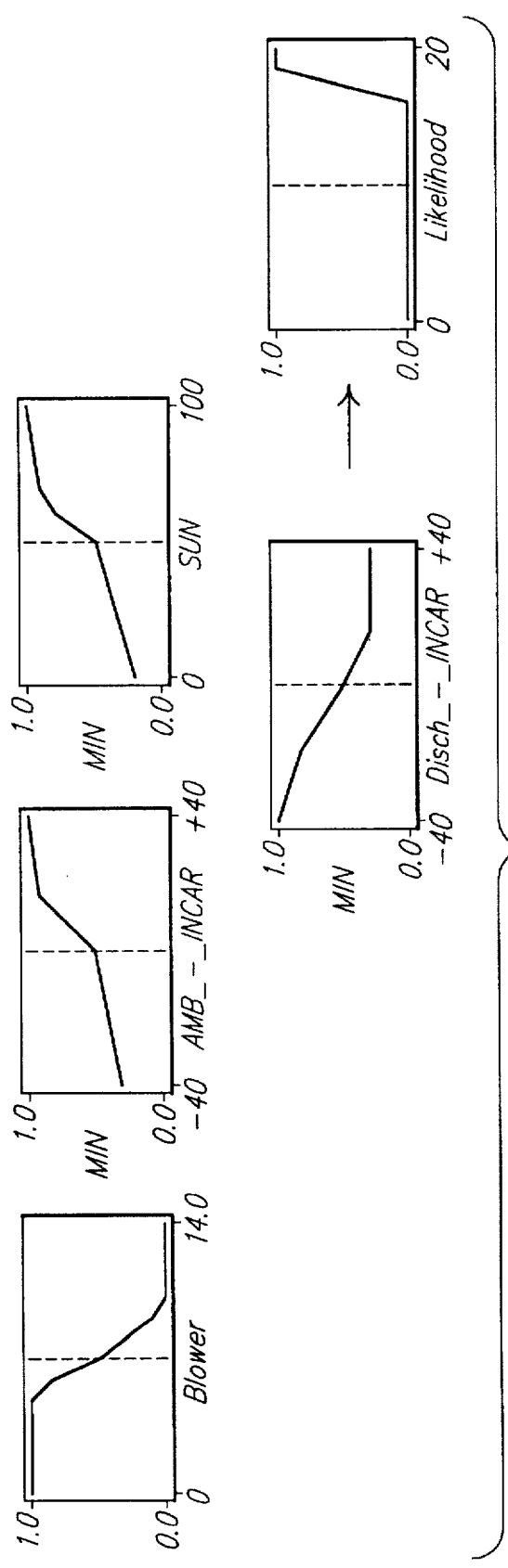
Fig. 6C
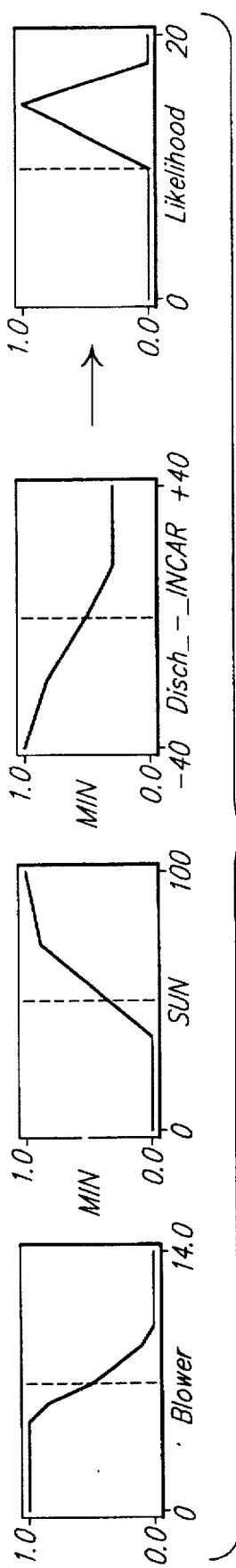
Fig. 6D

5,755,378

METHOD AND SYSTEM FOR CONTROLLING AN AUTOMOTIVE HVAC SYSTEM TO PREVENT FORMATION OF CABIN THERMAL STRATIFICATION

CROSS-REFERENCE TO RELATED APPLICATIONS

This application is related to the following commonly assigned U.S. patent applications:

U.S. Ser. No. 08/083,756, filed Jun. 30, 1993, entitled Method and Control System for Controlling an Automotive HVAC System;

U.S. Ser. No. 08/083,589, filed Jun. 30, 1993, entitled Method and System for Modifying a Linear Control Algorithm Which Controls an Automotive HVAC System, now U.S. Pat. No. 5,549,152;

U.S. Ser. No. 08/083,757, filed Jun. 30, 1993, entitled Method and Control System for Controlling an Automotive HVAC System to Prevent the Discharge of Air Within a Predetermined Temperature Range, now U.S. Pat. No. 5,427,313;

U.S. Ser. No. 08/361,407, filed Dec. 22, 1994, entitled Method and Control System for Economically Controlling an Automotive HVAC, now U.S. Pat. No. 5,553,776;

U.S. Ser. No. 08/363,076, filed Dec. 23, 1994, entitled Method and Control System for Controlling an Automotive HVAC System for Increased Occupant Comfort; and U.S. Pat. No. 08/363,085, filed Dec. 23, 1994, entitled Method and Control System for Controlling an Automotive HVAC System to Prevent Fogging, now U.S. Pat. No. 5,516,041.

TECHNICAL FIELD

This invention relates to methods and systems for modifying a control algorithm which controls an automotive HVAC system and, in particular, to methods and systems for modifying a control algorithm which controls an automotive HVAC system using fuzzy logic.

BACKGROUND ART

A fundamental goal of automotive heating, ventilating, and air conditioning (HVAC) systems is to make vehicle occupants comfortable. To achieve this goal, it is important that the design of the control system that establishes cabin conditions takes into account the relationship between comfort and the variables that affect comfort. Human comfort is a complex reaction, involving physical, biological, and psychological responses to the given conditions. Because of this complexity, the engineer must consider many variables and their possible interaction in the design strategy of such a control system or controller.

In an attempt to measure and control the many variables that affect comfort, modern automotive HVAC systems have many sensors and control actuators. A typical system might have a temperature sensor inside the passenger cabin, one measuring ambient temperature outside and others measuring various temperatures of the system internal workings. The occupant may have some input to the system via a selectable temperature set point or other adjustment. Additional sensors measuring sun heating load, humidity, etc. might be available to the system. The set of actuators might include a variable speed blower, some means for varying air temperature, ducting and doors to control the direction of air flow and the ratio of fresh outside air to recirculated air.

It falls to the controller to sort out the range of possible conditions, determine what is needed to achieve comfort, and coordinate the control of the set of actuators available. This multiple input, multiple output control problem does not fall into any convenient category of traditional control theory. The performance criterion, comfort, is not some well defined formula but a sometimes inconsistent goal, empirically determined. In particular, comfort control is not the same as temperature control. The response of the system as well as the relationship between system variables and desired performance, comfort, is rarely linear. Also, it is important to note that despite all the actuators and variables available for control, there may exist conditions under which comfort may not be achievable.

Due to practical considerations of size, energy consumption, cost and the wide conceivable range of conditions that automobiles are exposed to, the system plant may simply not be able to supply what is needed. All these considerations lead to a control problem that is far from what is usually encountered in traditional control theory.

In the face of these difficulties, most control system designs have used what is familiar—linear control—and supplemented it by patched-in specific responses to handle special circumstances where necessary. In other words, typical automobile automatic climate control systems use linear proportional control to maintain a comfortable interior environment. However, there are two significant limitations of linear proportional control when viewed from the standpoint of an occupant's subjective comfort: first, there are certain control situations in any HVAC system that are inherently nonlinear, and second, it is not possible to realize occupant comfort merely by maintaining proximity to a desired temperature as described in greater detail hereinbelow.

The design of a typical HVAC climate control system starts with the need to provide acceptable occupant comfort levels under the most extreme high and low ambient conditions that a vehicle might encounter. For these conditions, the control system is requesting the HVAC unit to operate at peak output in one direction or the other. Design considerations center around plant capacity and the efficiency of heat transfer in order to handle these extremes. The control system is effectively saturated until one or more of the input signals indicate that some level of comfort control is achievable.

It is at this point that the system begins to moderate its control of blower speed, the location of discharge air (mode of operation), and the relative blend of cooled and heated air. The simplest approach to control in this region is to have the control follow a straight line between the two extremes. Such a linear control algorithm adjusts the outputs in an appropriate manner and its parameters are easy to determine based on the points of onset of the two extreme regions. With a well defined HVAC system and enough developmental evaluation time, one can tune the coefficients to provide acceptable levels of comfort for a variety of operating conditions. The linear approach is quite well understood and easy to implement. For a small microprocessor-based controller, its essence is captured in a few lines of code.

This simple linear approach has obvious limitations when dealing with more complex situations. All HVAC systems behave nonlinearly in various regions of their operation. The transfer of heat as a function of blower speed is nonlinear. Convection, a necessary consideration in heat transfer, is a nonlinear phenomenon. Also, time variation of any parameters characterizing the performance of the climate control system is implicitly a nonlinear problem. It is unreasonable to expect a simple equation to perform well over both short-term, transient situations and longer-term, quasi-steady state conditions. Sometimes factors affecting such complications may be tracked via additional sensors - but unfortunately at additional cost.

The usual approach to handling special situations is to use logic-based modification of the usual linear strategy when these situations are detected. Unfortunately, the response of crisp (as opposed to fuzzy) logic in a control strategy does not fit well when human comfort is the goal. Abrupt changes in environment are not perceived favorably by most people. It is true that the effect of sudden changes occasioned by crisp logic transitions may be masked via input or output filtering. Also, some of the resulting conditions may not be experienced by the occupant as a level of discomfort.

Fuzzy Logic Approach

As previously mentioned, the description of comfort for most people is expressed in terms that are not particularly precise. If one asks people how they describe their comfort, we get answers such as "slightly cold", "fine", or "very hot." A person's comfort can easily be phrased in such vague terms but it is more difficult to interpret these expressions quantitatively. The imprecise nature of comfort description leads to the use of fuzzy logic in specifying a strategy for comfort control. Fuzzy logic provides procedures to incorporate knowledge expressed vaguely and yet arrive at a definite, calculable answer.

Fuzzy logic is a methodology for handling knowledge that contains some uncertainty or vagueness. The foundations of fuzzy logic were set forth in the 1960s by L. A. Zadeh in his paper entitled "Fuzzy Sets", INFORM. CONTR., 8 pp. 338–353, 1965.

In current engineering application, fuzzy logic is most often found in control problems in the form of a particular procedure, called "max-min" fuzzy inference as described by Ebrahim Mamdani in his paper entitled "Application of Fuzzy Logic to Approximate Reasoning Using Linguistic Synthesis", IEEE TRANSACTIONS ON COMPUTERS, (1977) C-26, No. 12, pp. 1182–1191. This procedure incorporates approximate knowledge of appropriate control response for different circumstances into sets of rules for calculating a particular control action. The rules are expressed in terms of "IF (situation holds), THEN (take consequent control action)". The degree to which a particular consequent action is taken depends on the degree to which its corresponding conditions hold. The linguistic expression of a situation or consequent control action is translated into a definite calculation via specified membership functions. A membership function quantifies what is meant by a phrase such as "The temperature is high" by defining the degree of membership in the class, "high", depending on the value of the input variable, temperature.

Stratification

Stratification of air temperatures within a vehicle cabin is a condition that may occur after operating the climate control system for an extended period under certain steady conditions. For exterior ambient temperatures warmer than those inside the vehicle and low blower speeds, the cold discharge air may not mix well in the cabin, but pool near the floor. The warm air in the passenger cabin may stay near the roof (which may also be warm due to the exterior ambient temperature) setting up a fairly stable air temperature gradient within the cabin. It is also possible that strong sunload may similarly lead to such a situation, even if ambient temperatures do not exceed cabin temperatures. If air circulation in the cabin is not strong enough to overcome the temperature gradient thus set up, the difference in temperature between air at foot level and breath level (near the ceiling of the passenger compartment) will continue to grow. The resulting temperature difference can become quite noticeable to occupants. Stratification can be characterized as being a nonlinear (as it is due to convection), time varying, and distributed process. As such, it does not lend itself well to linear control stratagems. The analysis in detail of stratification and air circulation patterns within a (mostly) enclosed space in the face of strong convective propensities is extremely complicated. The behavior of such convective systems is known to have transition points and air circulation patterns that are very sensitive to slight changes in parameters and initial conditions, even to the extent of exhibiting chaotic behavior. There are sizable uncertainties in predicting what may happen to the temperature distribution even if everything about the system is well characterized. Nevertheless, there are empirical indications that appropriate use of forced air circulation can overcome the onset of set circulation patterns that lead to stratification. Also, there is a degree of freedom available in establishing the necessary heat transfer that may allow the defeat of stratification without sacrificing occupant comfort.

Testing of a vehicle such as is represented in FIG. 3 resulted in the temperature graphs shown in FIG. 4. Temperatures were sampled at four different elevational levels within the passenger cabin of the vehicle and represented as "breath level," "head level," cabin level" and "foot level". Samples of temperature at each level were taken and plotted against changes in blower speed. From FIG. 4, it can be seen that for the given conditions, stratification (a wide range in temperatures across the different levels) is most likely when the blower speed is low and less likely at higher speeds.

SUMMARY OF THE INVENTION

It is an object of the present invention is to provide a nonlinear method for modifying a control algorithm which controls an automotive HVAC system to infer the likelihood of stratification development and avoid its formation.

It is another object of the present invention is to provide a system which carries out the method for modifying a control algorithm which controls an automotive HVAC system to both infer the likelihood of stratification development and avoid its formation.

It is yet another object of the present invention to provide a method of inferring the likelihood of stratification development in the passenger compartment of an automotive vehicle based upon the monitoring of blower speed, ambient temperature, cabin temperature, sunload and discharge temperature, and using fuzzy logic. Currently, in most vehicles there is only one interior temperature sensor, so the existence of a stratification condition cannot be detected directly. Nevertheless, the likelihood that the condition could occur may be inferred from the history of system states. The strategy described herein computes a number representing the likelihood of stratification which is dependent on current conditions. This number is accumulated over time and the result represents the probability that stratification exists. Certain conditions, such as a door or window being opened, can modify or reset the value of this probability, but in general it will grow until some action is taken that decreases the likelihood.

The likelihood of stratification, that is, the number that represents the rate of accumulation of probability of stratification, can be computed from measured conditions in the vehicle cabin. For example, a set of fuzzy rules that would compute this likelihood would be:

IF Blower Speed is HIGH, then
Likelihood LOW.

IF(Ambient Temp.—Cabin Temp.) is LOW, then
Likelihood LOW.

IF Blower Speed is LOW, and
(Ambient Temp.—Cabin Temp.) HIGH, and
Sunload is MED.HIGH, and
Discharge Temperature is LOW, then
Likelihood HIGH.

IF Blower Speed is LOW, and
Sunload is HIGH, and
Discharge Temperature is LOW, then
Likelihood MED.HIGH.

Here, the capitalized words represent membership functions are instantiated values to be determined in calibration of a particular vehicle. Thus computed, the variable "Likelihood" would be integrated over time. The result represents a probability that stratification will or is occurring. When a certain probability of stratification is exceeded, corrective measures such as increasing the blower speed could be taken.

In carrying out the above objects of the present invention, a method is provided for automatically modifying the control of a heating, ventilation and air conditioning (HVAC) system of a vehicle which discharges a flow of air into the passenger cabin of a vehicle. The control system has a plurality of variables, including cabin temperature, ambient temperature and blower speed, and a plurality of calibration coefficients. The system includes a variable speed blower, means for varying air temperature of air discharged into the cabin, ducting means for controlling the direction of air flow; and actuator means having various control positions for controlling the ratio of fresh air to recirculated air. The system also includes, sensor means for sensing temperature at a predetermined location within the cabin, sensor means for sensing ambient temperature, sensor means for sensing sun load, and means for providing a passenger controlled temperature setting.

The method includes the step of defining a first set of membership functions and fuzzy rules between the ambient temperature, cabin temperature and a blower speed variables. The method also includes the step of modifying the blower speed variable based on the first set of membership functions and the fuzzy rules.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 is a graphical representation of the quantity of air versus the temperature of air supplied by a HVAC system and the work effort required for such supply.

BEST MODE FOR CARRYING OUT THE INVENTION

Figure 1:
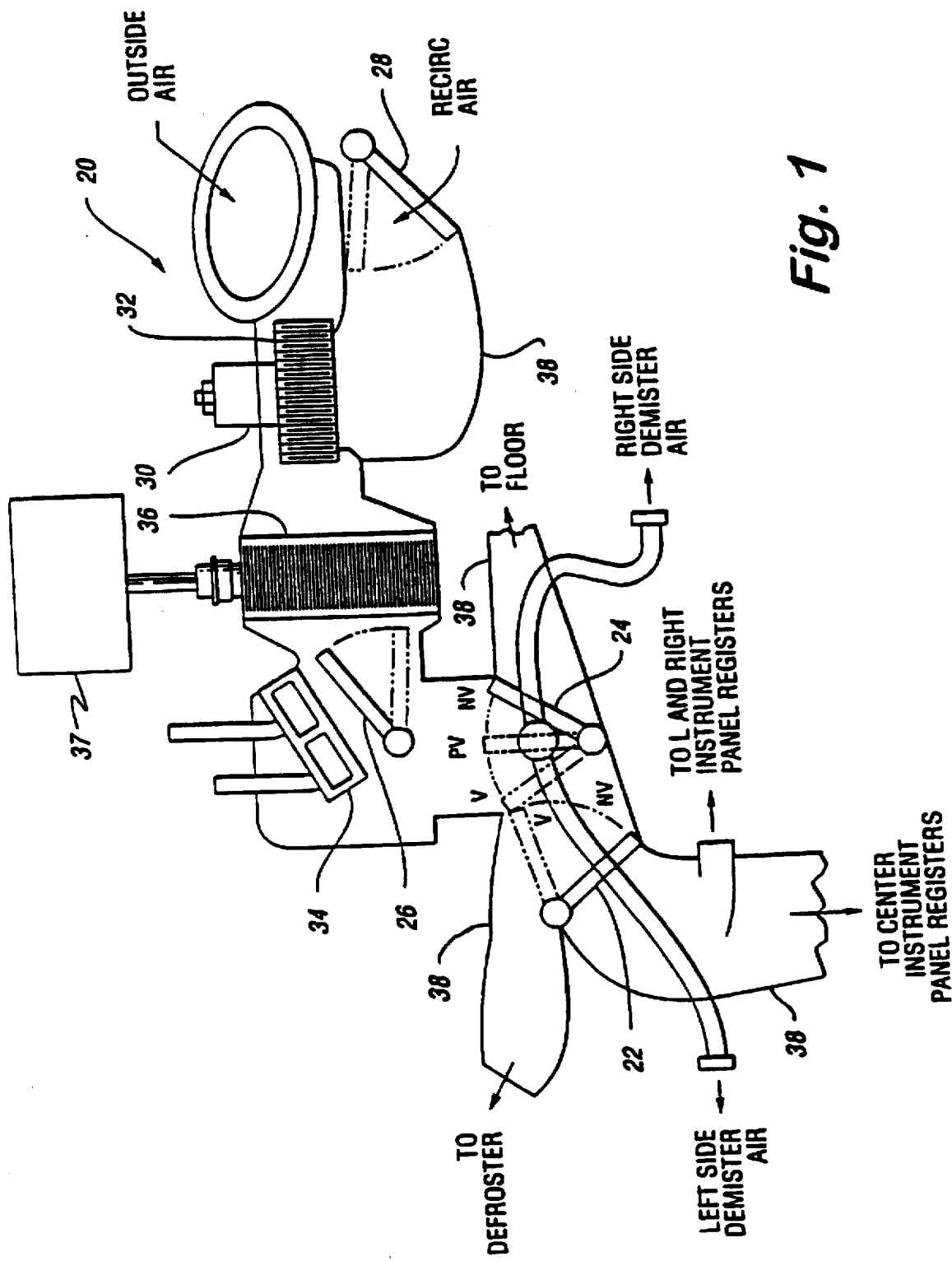
FIG. 1 is a schematic diagram illustrating an air handling system which can be controlled by the method and control system of the present invention.

In general, control of temperature within an automobile is accomplished using various actuators to adjust the temperature and flow of air supplied to the cabin of the vehicle. FIG. 1 shows schematically an air handling system of an HVAC (heating, ventilation and air conditioning) system, generally indicated at 20. The system 20 includes the arrangement of panel-defrost, floor-panel, temperature blend and outside/recirculating air actuators or doors 22, 24, 26 and 28, respectively. The doors 22, 24 and 28 are driven by vacuum motors (not shown) between their various vacuum, partial vacuum and no vacuum positions in a conventional fashion as indicated in FIG. 1. The door 26 is driven by an electric servo motor also in a conventional fashion.

The system 20 also includes a variable speed blower motor or fan 30 including a blower wheel 32.

The system of FIG. 1 further includes heating and cooling elements such as a heater core 34 and an evaporator core 36 in a typical vehicle heating and air conditioning plant. Each of the above components is in communication with a ducting structure 38 in order to control temperature, the direction of air flow and the ratio of fresh air to recirculated air entering the passenger cabin at the floor, instrument panel and defroster levels.

For automatic control of the temperature and flow of air in the passenger cabin, conditions within and outside the cabin are monitored by sensors and an electronic controller generates signals to control the plant actuators according to the conditions as indicated by the sensors.

Figure 2:
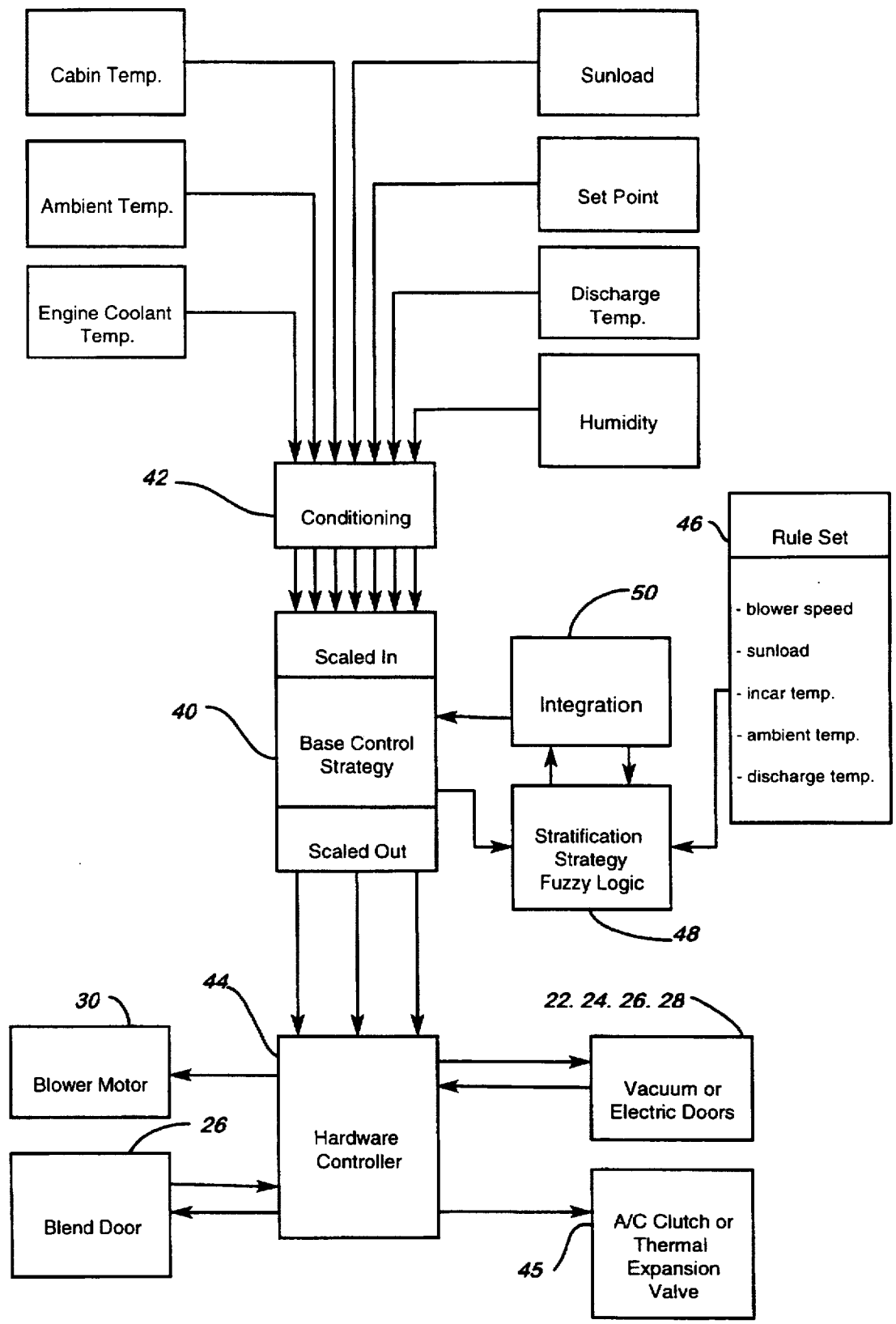
FIG. 2 is a schematic block diagram of the control system of the present invention.
Figure 3:
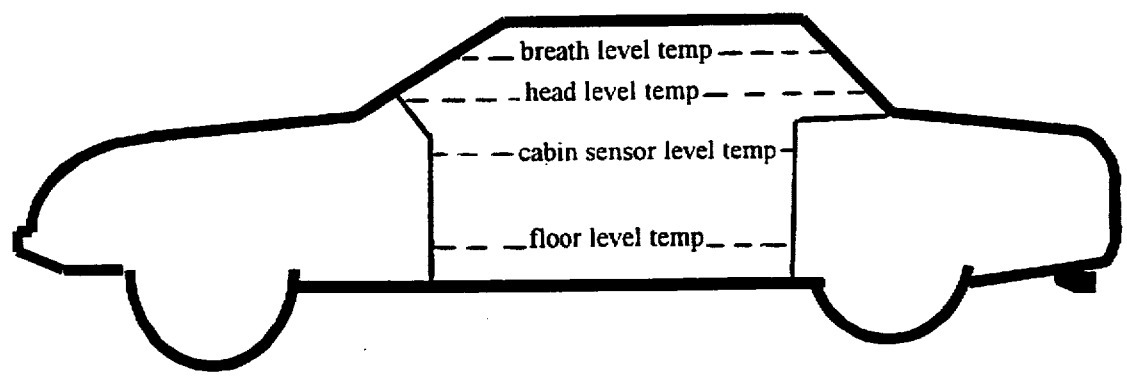
FIG. 3 is a vehicle diagram illustrating the temperature sampling levels used in testing for the effects of stratification.

As illustrated in FIG. 2, a typical complement of sensors of the HVAC system provide signals which are representative of cabin temperature, ambient (outside) air temperature, engine coolant temperature (ECT), discharge air temperature, sunload and humidity. In addition, there is a set signal or set temperature value indicating the desired temperature that is set manually by the driver.

The signals are provided to an electronic controller 40 as inputs after being filtered to remove noise and improve accuracy by a conditioning circuit 42. The controller 40 scales the input signals which are used by the base control strategy to determine how the system should be functioning, and provides scaled output signals for use by a hardware controller 44. The hardware controller 44 responds to the output of the controller 40 and appropriately controls the doors 22, 24, 26, 28 and blower motor 30 individually to regulate the temperature and flow of air and ultimately to maintain the comfort of driver and passengers in the vehicle.

A control strategy, based on fuzzy logic, is represented by rule sets 46 for modifying the base controller 40 to control stratification.

Sensor inputs are conditioned, scaled, and passed from the controller 40 to the stratification strategy fuzzy logic control 48. The stratification strategy fuzzy logic control 48 is a fuzzy inference engine for the controller 40. Rule sets 46 for the various functions provide the inference engine 48 with the details of the strategy to be performed. The fuzzy outputs are integrated at 50 and used by the routines in the control strategy 40 to modify the control of the motors, actuators, and doors that accomplish the flow and conditioning of the air supplied to the passenger compartment. The rule set basis for control organizes the strategy in a manner that allows easy calibration and adjustment of the control operation to determine the likelihood and overcome stratification.

Equation 1 below shows a typical linear control formula. The coefficients, $K_1$, $K_2$, $K_3$, and $K_4$ are constant gains that must be calibrated to compensate for the effect of their respective terms on the resulting control. The formula uses inputs from the system's sensors to calculate the amount of HVAC heating or cooling work necessary to provide a desired thermal comfort level for the cabin occupants. The control value calculated is scaled and used for both blower speed and blend door actuation.

$$\text{Work}=K1^*(\text{Comfort}-\text{Offset})-K2^* (\text{Sunload})-K3^* (T_{ambient}-72)$$
$$-K4^* (T_{cabin}-72)+K5^* (T_{set\_point}-72) \quad \text{Equation 1}$$

The occupant's thermal comfort level is quantified using a subjective rating scale with low numbers indicating cold and high numbers indicating hot. In the equation, comfort would be set to a value corresponding to a desired thermal comfort rating.

The HVAC work supplied to the cabin is defined as:

$$\text{Work}=Q_{air}^* (T_{discharge\_air}-72)$$

HVAC work is a function of the quantity ($Q_{air}$) and the temperature ($T_{discharge\_air}$) of the air discharged into the cabin. We can realize a desired amount of HVAC work necessary for thermal comfort with an infinite number of $Q_{air}$ and $T_{discharge\_air}$ combinations, within the capacity limits of the system.

The optimal combination of $Q_{air}$ and $T_{discharge\_air}$ is a function of many factors. One of the factors is the probability of cabin temperature stratification. Say, for example, the likelihood of vehicle temperature stratification is high. To reduce stratification, we want to increase the circulation of air in the cabin. This can be achieved by increasing the discharge air flow rate, $Q_{air}$. At the same time we want to maintain a desired amount of HVAC work into the cabin to sustain the occupant's thermal comfort. Using the equation for work, we can increase $Q_{air}$ and maintain comfort by concurrently changing $T_{discharge\_air}$.

FIG. 5 is a graphical illustration of an envelope that contains allowable combinations of $Q_{air}$ and $T_{discharge\_air}$. For practical considerations it is preferable to constrain the combination of $Q_{air}$ and $T_{discharge\_air}$ within certain limits illustrated by the dark lines and labeled as "upper envelope limit" and "lower envelope limit." For example, the system may increase $Q_{air}$ to help reduce stratification. At the same time, the system should be restricted to operate the system within an upper limit on $Q_{air}$. Such a limit might be imposed, for example, to avoid excessive noise.

Figure 4:
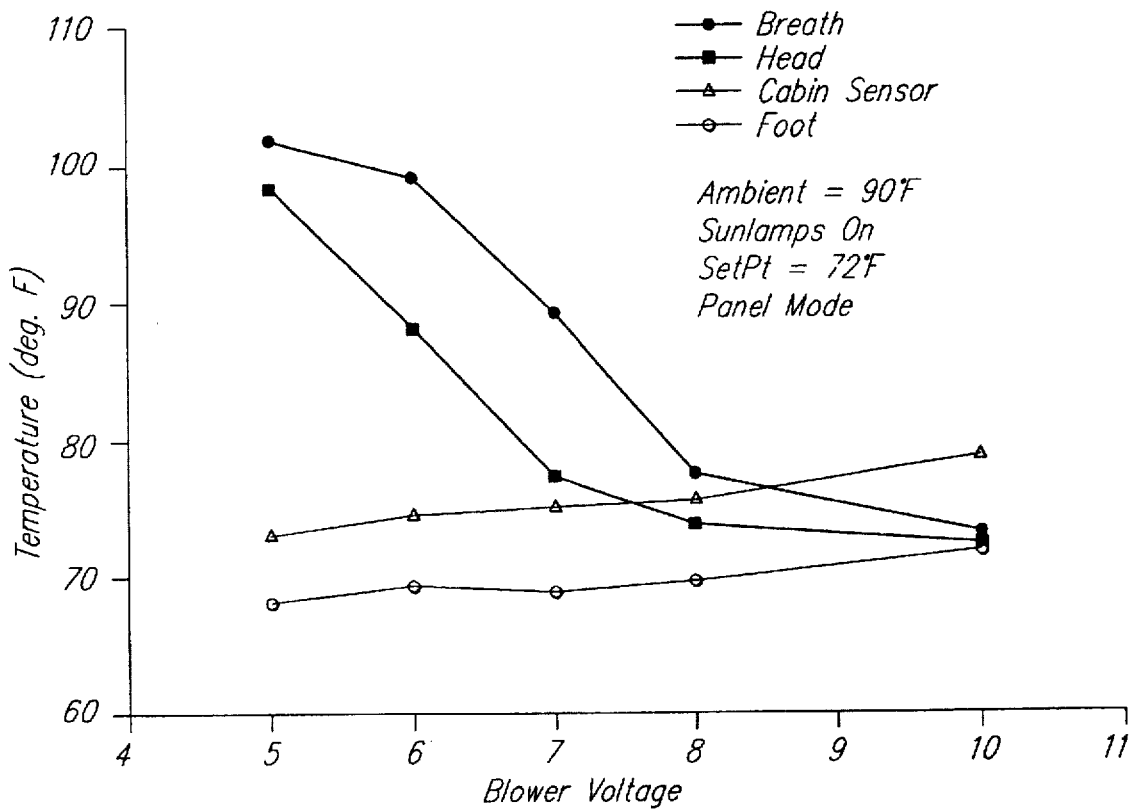
FIG. 4 shows data taken in a test vehicle operated in a test chamber.

Referring again to FIGS. 1, 2 and 4, the likelihood of stratification of an automobile heating/air conditioning system 20 can be considered a function of blower speed, ambient-cabin temperature difference (ambient temperature—cabin temperature), and sunload.

Figure 6A:
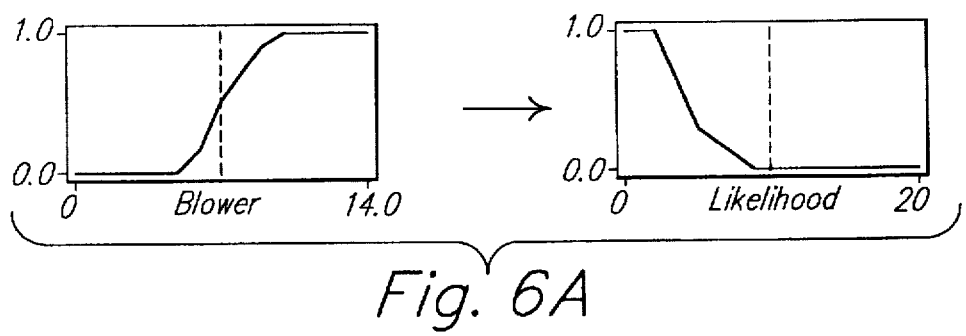
FIG. 6 contains graphical illustrations of four stratification likelihood rule sets including antecedent and corresponding consequent membership functions.
Figure 6B:
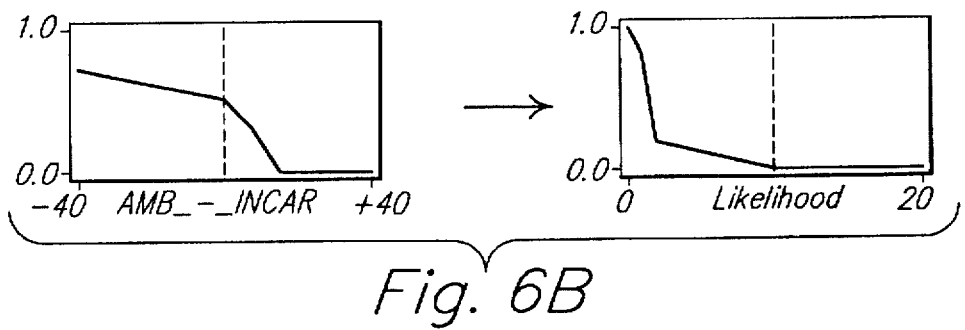

FIG. 6 shows a graphical illustration of four stratification likelihood rule sets including antecedent and corresponding consequent membership functions. The degree to which a rule holds is computed from the antecedent membership functions on the left which are dependent on their respective input values. The consequent membership functions on the right define the degree of likelihood that stratification is occurring. The integration of likelihood values determine how and to what speed the blower will be driven to overcome the occurrence of stratification. That is, as the likelihood changes, the blower speed will be appropriately adjusted.

The heuristic rules for blower speed are presently seen as follows:

Rule 1. IF Blower Speed is HIGH, then Likelihood LOW;

Rule 2. IF(Ambient temp.—Cabin temp.) LOW, then Likelihood LOW;

Rule 3. IF Blower Speed is LOW, and
(Ambient temp.—Cabin temp.) HIGH, and
Sunload is MED.HIGH, and
Discharge Temperature is LOW, then
Likelihood HIGH;

Rule 4. IF Blower Speed is LOW, and
Sunload is HIGH, and
Discharge Temperature is LOW, then
Likelihood MED.HIGH.

Referring again to FIG. 2, the controller 40 preferably uses a Motorola 68HC11 microprocessor for its calculations. This microprocessor has 512 bytes of RAM and 12 kilobytes of ROM built in. It uses an 8 megahertz clock providing a 500 nanosecond instruction cycle time. An eight channel analog-to-digital converter is integrated into the microprocessor. Six of the eight channels are used to measure inputs that are used by the control system, namely: cabin temperature, ambient (outside) temperature, engine coolant temperature, air discharge temperature, humidity and sunload. A seventh input to the system is the set point temperature which may be adjusted by the vehicle occupants using buttons or other input devices on the front face of the control unit.

The controller 40 is preferably programmed primarily in C and cross-assembled into microprocessor instructions. Each fuzzy rule set is incorporated into the fuzzy engine as a set of tables that have been previously converted into a form that allows for efficient calculation during run time. The fuzzy logic control procedure is called as part of the main loop, which is executed every 30 milliseconds. The fuzzy logic engine occupies approximately 600 bytes of ROM and uses 12 bytes of RAM during its execution. Execution time for a fuzzy calculation is typically 20 milliseconds.

While the best mode for carrying out the invention has been described in detail, those familiar with the art to which this invention relates will recognize various alternative designs and embodiments for practicing the invention as defined by the following claims.

We claim:

1. A method of determining the occurrence of air stratification in the passenger cabin of a vehicle and automatically overriding an algorithm used in the control of a heating, ventilation and air conditioning (HVAC) system of said vehicle which discharges a flow of air into said passenger cabin, the control system algorithm having a plurality of variables, including cabin temperature, ambient temperature and blower speed, and a plurality of calibration coefficients, and said system includes a variable speed blower, means for varying air temperature of air discharged into the cabin, ducting means for controlling the direction of air flow; actuator means having various control positions for controlling the ratio of fresh air to recirculated air; sensor means for sensing temperature at a predetermined location within the cabin; sensor means for sensing ambient temperature; sensor means for sensing sun load; and means for providing a passenger controlled temperature setting;

said method includes the steps of defining a set of membership functions and fuzzy rules between the ambient temperature, cabin temperature and blower speed variables; estimating the probable level of stratification; and modifying the blower speed variable based on the probable level of stratification estimate.

2. A method as in claim 1, wherein the membership functions are instantiated values of predetermined low, medium-high and high threshold values.

3. A method as in claim 2, wherein one of the rules determines the likelihood of stratification as being low if the blower speed is high.

4. A method as in claim 3, wherein a second one of the rules in said set of fuzzy rules determines that the likelihood of stratification occurring is low if the difference between the sensed ambient temperature and sensed cabin temperature is low.

5. A method as in claim 4, wherein a third one of the rules in said set of fuzzy rules determines that the likelihood of stratification occurring is high if the blower speed is low, difference between the sensed ambient temperature and sensed cabin temperature is high discharge temperature is low.

6. A method as in claim 5, wherein said system includes a means for sensing sunload and said third one of the rules in said set of fuzzy rules determines that the likelihood of stratification occurring is high if the sunload is also medium-high or above.

7. A method as in claim 5, wherein said system includes a means for sensing sunload and a fourth one of the rules in said set of fuzzy rules determines that the likelihood of stratification occurring is medium-high if the blower speed is low, the sunload is high and the discharge temperature is low.

* * * * *